United States Patent
Yamaguchi et al.

(10) Patent No.: US 8,789,633 B2
(45) Date of Patent: Jul. 29, 2014

(54) VEHICLE INCLUDING INTAKE ASSEMBLY HAVING SNORKEL

(71) Applicant: Honda Motor Co., Ltd., Tokyo (JP)

(72) Inventors: Hiromasa Yamaguchi, Dublin, OH (US); Rodney M. Frijas, Powell, OH (US); Andrew James Wilson, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/707,859

(22) Filed: Dec. 7, 2012

(65) Prior Publication Data
US 2014/0158442 A1 Jun. 12, 2014

(51) Int. Cl.
*B60K 13/02* (2006.01)

(52) U.S. Cl.
CPC ..................... *B60K 13/02* (2013.01)
USPC .................. 180/68.3; 180/68.1; 180/68.2

(58) Field of Classification Search
CPC ......... B60K 13/02; B60K 11/04; B60K 11/00
USPC ............ 180/68.1, 68.2, 68.3, 68.4, 68.5, 311, 180/89.1
See application file for complete search history.

(56) References Cited

U.S. PATENT DOCUMENTS

| | | | |
|---|---|---|---|
| 6,622,806 B1 * | 9/2003 | Matsuura | 180/68.1 |
| 7,121,371 B2 * | 10/2006 | Rondeau et al. | 180/89.1 |
| 7,311,170 B2 | 12/2007 | Isoda et al. | |
| 7,374,009 B2 | 5/2008 | Yamamoto et al. | |
| 7,377,570 B2 * | 5/2008 | Rondeau et al. | 180/908 |
| 7,562,739 B2 * | 7/2009 | Lan et al. | 180/68.1 |
| 7,730,986 B2 | 6/2010 | Takeshima et al. | |
| 8,196,689 B2 * | 6/2012 | Hosoda | 180/68.4 |
| 8,413,758 B2 * | 4/2013 | Shiina et al. | 180/311 |
| 2005/0288151 A1 * | 12/2005 | Yamamoto | 477/110 |
| 2011/0174569 A1 | 7/2011 | Shiina et al. | |

* cited by examiner

*Primary Examiner* — Hau Phan
(74) *Attorney, Agent, or Firm* — Ulmer & Berne LLP (57) ABSTRACT

A vehicle includes a frame, a steering assembly, an engine, a seat, an intake assembly, at least two electrical conductors, and an electrical coupler. The intake assembly includes a snorkel and a cover member. The snorkel includes an inlet and outlet port. The inlet port has a neck portion that defines an opening. The cover member is in fluid communication with the inlet port of the snorkel. The electrical coupler is engaged with the at least two electrical conductors and is configured to facilitate selective manual electrical disconnection of the at least two electrical conductors. A first imaginary plane intersects the opening and is substantially horizontal. A second imaginary plane extends laterally across the vehicle, intersects the opening, and intersects the first imaginary plane at a right angle. The electrical coupler is disposed entirely above the first imaginary plane and entirely forwardly of the second imaginary plane.

18 Claims, 5 Drawing Sheets

VEHICLE INCLUDING INTAKE ASSEMBLY HAVING SNORKEL

TECHNICAL FIELD

A vehicle includes an intake assembly and an electrical coupler for facilitating selective manual connection of a pair of electrical conductors.

BACKGROUND

Many conventional vehicles, such as saddle-type vehicles, include electrical couplers that facilitate selective connection of a pair of electrical conductors. These electrical couplers are oftentimes located in areas along the vehicle that are prone to exposure to water. As a result, the electrical couplers are often provided as waterproof-type couplers which are expensive and labor intensive to implement.

SUMMARY

In accordance with one embodiment, a vehicle extends along a longitudinal axis between a front end and a rear end. The vehicle comprises a frame, a steering assembly, an engine, a seat, an intake assembly, at least two electrical conductors, and an electrical coupler. The steering assembly is pivotally coupled to the frame. The engine is supported by the frame. The seat is supported by the frame rearwardly of the steering assembly and overlies at least a portion of the engine. The intake assembly is disposed rearwardly of the steering assembly and comprises a snorkel and a cover member. The snorkel comprises an inlet port and an outlet port. The inlet port has a neck portion that defines an opening. The outlet port is in fluid communication with the engine. The cover member is in fluid communication with the inlet port of the snorkel. The electrical coupler is engaged with each of the at least two electrical conductors and is configured to facilitate selective manual electrical disconnection of the at least two electrical conductors. A first imaginary plane intersects the opening of the inlet port and is substantially horizontal. A second imaginary plane extends laterally across the vehicle, intersects the opening of the inlet port, and intersects the first imaginary plane at a right angle. The electrical coupler is disposed entirely above the first imaginary plane and entirely forwardly of the second imaginary plane.

In accordance with another embodiment, a vehicle extends along a longitudinal axis between a front end and a rear end. The vehicle comprises a frame, a plurality of wheels, a steering assembly, an engine, a seat, an intake assembly, at least two electrical conductors, and an electrical coupler. The plurality of wheels is rotatably supported by the frame. The steering assembly is pivotally coupled to the frame and is configured to facilitate steering of at least one the plurality of wheels. The engine is supported by the frame. The seat is supported by the frame rearwardly of the steering assembly and overlies at least a portion of the engine. The intake assembly is disposed rearwardly of the steering assembly and comprises a snorkel and a cover member. The snorkel comprises an inlet port and an outlet port. The inlet port has a neck portion that defines an opening. The outlet port is in fluid communication with the engine. The cover member defines a lower opening and overlies the inlet port of the snorkel. The neck portion of the inlet port extends at least partially into the lower opening. The electrical coupler is releasably engaged with each of the at least two electrical conductors and is configured to facilitate selective manual electrical disconnection of the at least two electrical conductors. The first imaginary plane intersects the opening of the inlet port and is substantially horizontal. The second imaginary plane extends laterally across the vehicle, intersects the opening of the inlet port, and intersects the first imaginary plane at a right angle. The first imaginary plane and the second imaginary plane intersect at an imaginary line. A third imaginary plane intersects each of the first imaginary plane and the second imaginary plane such that the imaginary line resides entirely within the third imaginary plane. The third imaginary plane is angled from the first imaginary plane by an angle of between about 20 degrees and about 30 degrees. The electrical coupler is disposed entirely above the third imaginary plane.

BRIEF DESCRIPTION OF THE DRAWINGS

It is believed that certain embodiments will be better understood from the following description taken in conjunction with the accompanying drawings in which.

DETAILED DESCRIPTION

Figure 1:
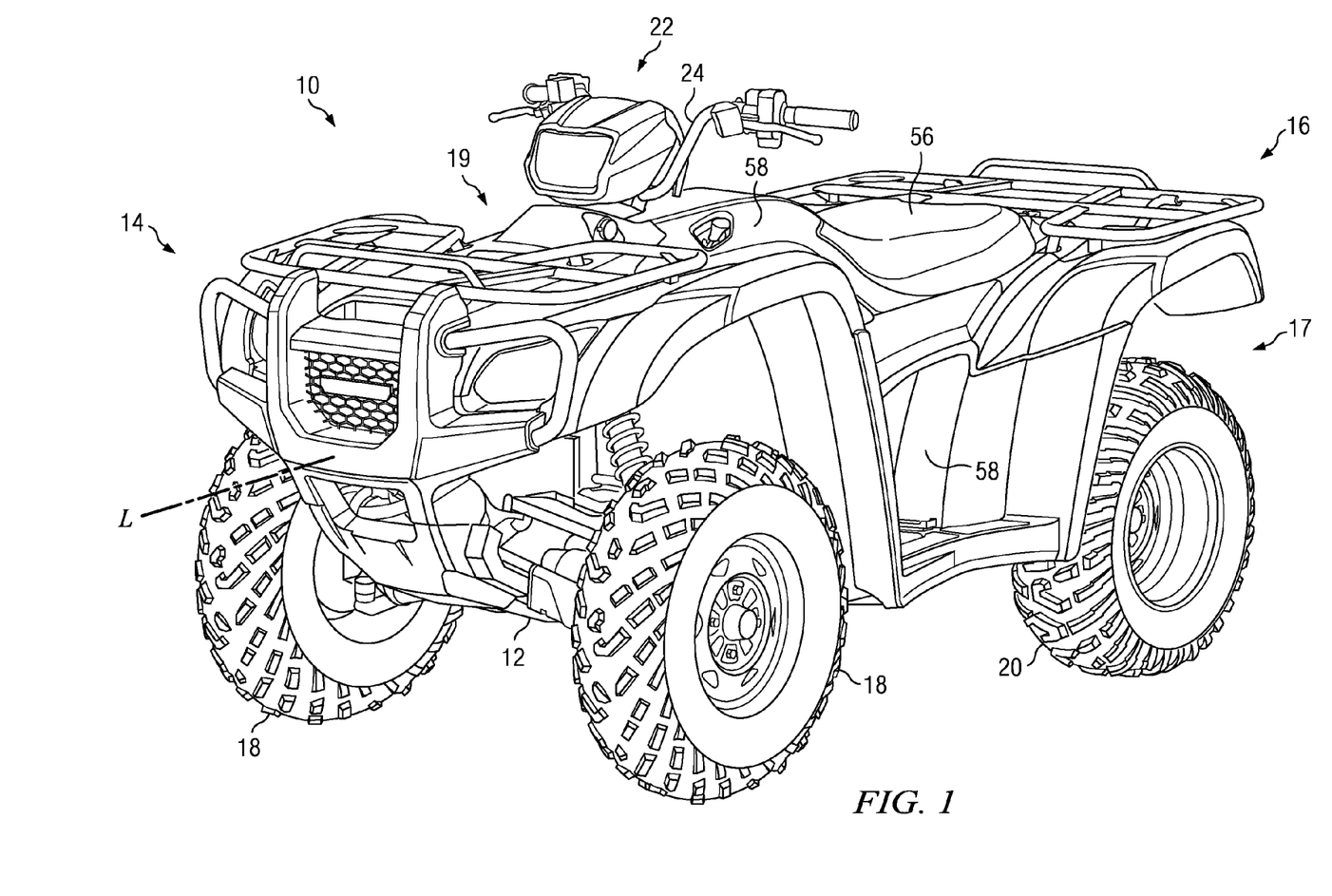
FIG. 1 is a front perspective view of a vehicle in accordance with one embodiment.

Embodiments are hereinafter described in detail in connection with the views and examples of FIGS. 1-5, wherein like numbers indicate the same or corresponding elements throughout the views. A vehicle can include a vehicular engine assembly having an engine and an intake assembly that is in fluid communication with the engine. A vehicle 10 is illustrated in FIG. 1 and is depicted as a saddle-type vehicle. A saddle-type vehicle can comprise an all-terrain vehicle ("ATV" as shown in FIG. 1), a motorcycle, a scooter, a snowmobile, or a personal watercraft, for example. Other suitable vehicles can comprise, for example, an automobile, a truck, a van, a recreational vehicle, a watercraft, an aircraft, agricultural equipment, construction equipment, a toy, a mower, or any of a variety of other vehicles. The vehicle 10 can include a frame 12 that can be of a tubular construction or can be provided in any of a variety of other suitable arrangements, such as a unibody construction, for example, and can be formed using any of a variety of materials, such as metal or carbon fiber, for example. The vehicle 10 can extend along a longitudinal axis L between a front end 14 and a rear end 16 and can extend laterally between a left side 17 and a right side 19.

As illustrated in FIG. 1, front wheels 18 and rear wheels (e.g., 20) can be rotatably coupled to the frame 12. The vehicle 10 can include a steering assembly 22 that is pivotally coupled with the frame 12. The steering assembly 22 can include a set of handlebars 24 coupled with the front wheels 18 and configured to facilitate steering of the front wheels 18. It will be appreciated that any of a variety of suitable alternative steering assembly configurations can be provided for steering wheels of a vehicle.

Figure 2:
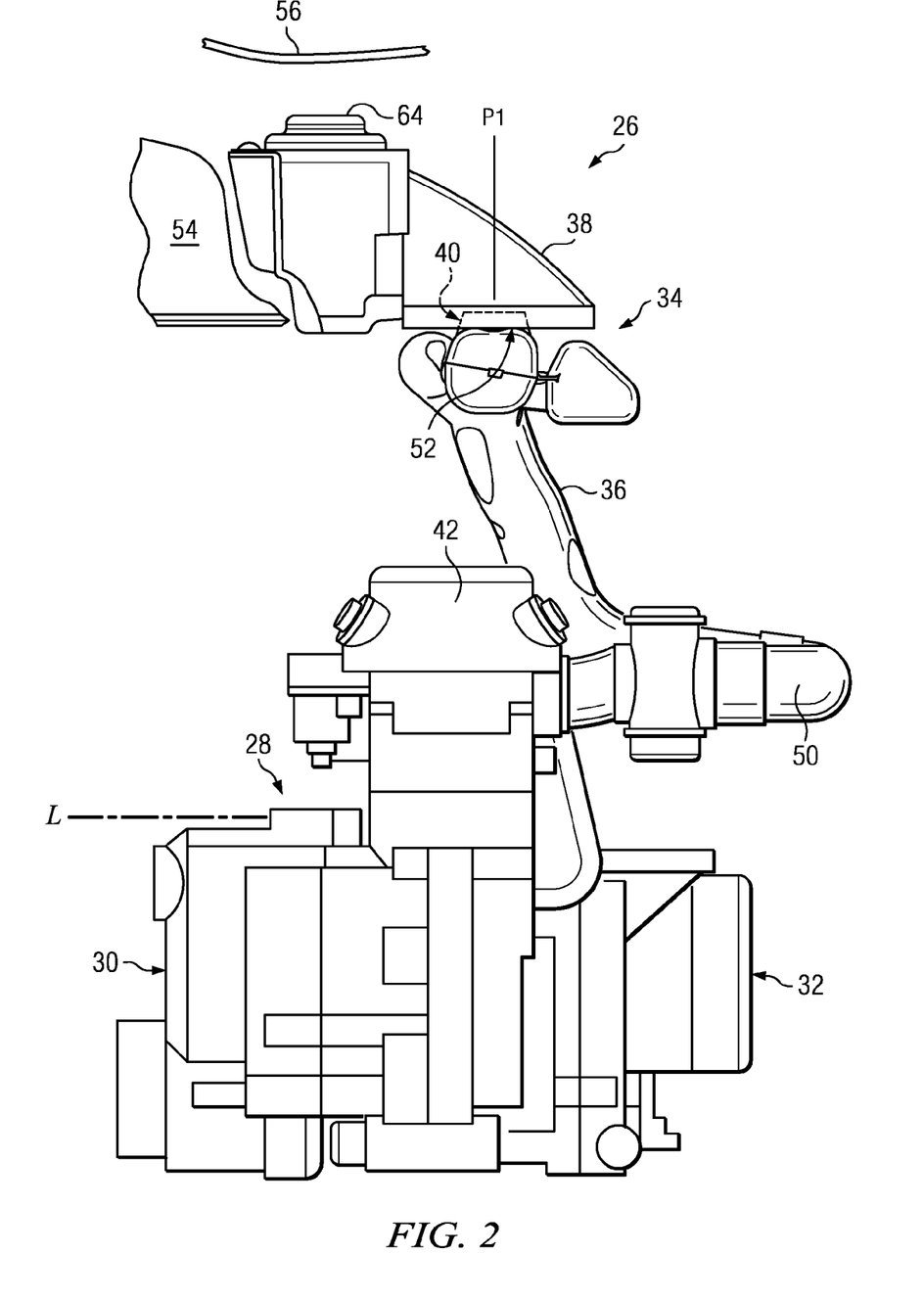
FIG. 2 is a side view depicting a vehicular engine assembly of the vehicle of FIG. 1 shown apart from the rest of the vehicle and including a snorkel, a cover member, a support housing, and a fuel tank, in accordance with one embodiment.
Figure 3:
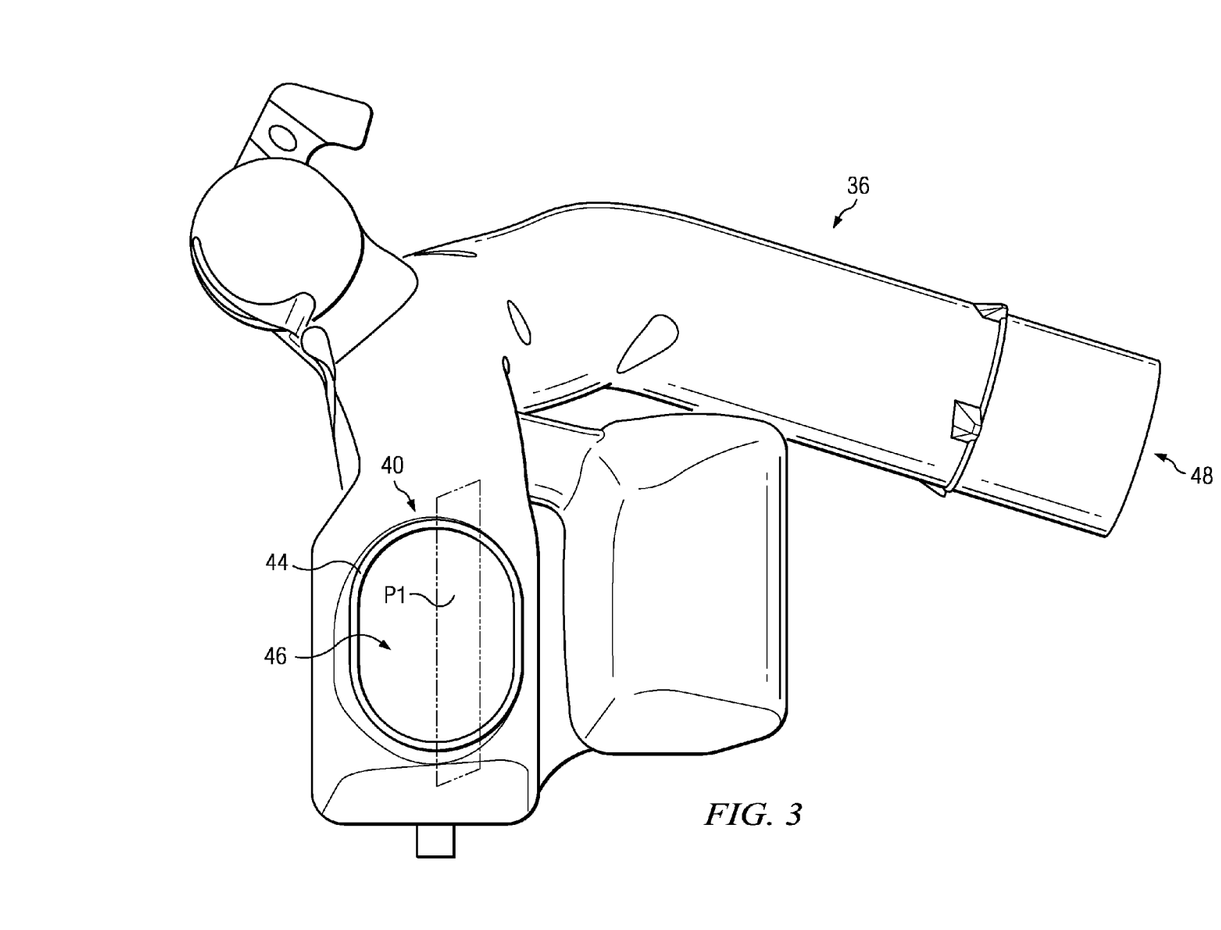
FIG. 3 is an upper perspective view depicting the snorkel of FIG. 2 shown apart from the rest of the vehicular engine assembly and with a vertical imaginary plane that intersects an opening of the snorkel.

As illustrated in FIG. 2, the vehicle 10 can include a vehicular engine assembly 26 that is supported by the frame 12. The vehicular engine assembly 26 can include an engine 28 that extends along the longitudinal axis L between a front end 30 and a rear end 32. The engine 28 can include a crankshaft (not shown) which in some embodiments is substantially parallel with the longitudinal axis L and in other embodiments is transverse to the longitudinal axis L. The vehicular engine assembly 26 can also include an intake assembly 34 having a snorkel 36 and a cover member 38. The snorkel 36 can have an inlet port 40 at one end that is in fluid communication with the cover member 38. As illustrated in FIGS. 2 and 3, the snorkel 36 can include an outlet port 48 that is in fluid communication with a U-shaped coupler 50. The U-shaped coupler 50 can be fluidly coupled to an intake manifold 42 of the engine 28 to facilitate fluid communication between the outlet port 48 of the snorkel 36 and the intake manifold 42. The cover member 38 can be configured to receive ambient air which is then routed through the snorkel 36 and into the intake manifold 42 to facilitate combustion of fuel within the engine 28. Although the snorkel 36 is shown to comprise a tubular structure that is configured in such a manner to facilitate fluid communication between a cover member and an underlying engine, it will be appreciated that a snorkel can be provided in any of a variety of other configurations that facilitate routing of ambient air to an engine.

As illustrated in FIGS. 2 and 3, the inlet port 40 can include a neck portion 44 that defines an opening 46. The cover member 38 can define a lower opening 52 and can overlie the snorkel 36 such that the neck portion 44 of the snorkel 36 extends at least partially into the lower opening 52. The lower opening 52 can be sized to interact with the neck portion 44 in a manner that promotes effective fluid communication between the cover member 38 and the inlet port 40. In one embodiment, the neck portion 44 and the lower opening 52 can fit together in an interference fit with a sealing gasket (not shown) provided between the neck portion 44 and the cover member 38 to seal the interaction between the neck portion 44 and the cover member 38. However, it will be appreciated that a neck portion of a snorkel can be coupled with a cover member in any of a variety of other suitable configurations. In yet another alternative embodiment, a neck portion of a snorkel and a cover member can be formed together as a one-piece construction.

The engine 28 and the intake assembly 34 can be positioned rearwardly of the steering assembly 22. As illustrated in FIG. 1, the vehicle 10 can include a seat 56 supported by the frame 12 rearwardly of the steering assembly 22. The seat 56 can be positioned to overlie the engine 28 and the intake assembly 34 such that the engine 28 and intake assembly 34 are provided between the legs of a seated rider on the seat 56. The seat 56 can cooperate with adjacent cover panels (e.g., 58) to substantially conceal the engine 28, the intake assembly 34, and/or a fuel tank 54 (FIG. 4) which can provide an aesthetically pleasing look to the vehicle 10. The seat 56 and the cover panels (e.g., 58) can also facilitate shielding of the cover member 38 and/or the opening 46 of the snorkel 36 from passing debris, falling precipitation, debris from the wheels, or other particulates that could be harmful when introduced to an exposed intake system.

The opening 46 of the snorkel 36 is shown in FIG. 2 to be elevated with respect to the engine 28. When the vehicle 10 is immersed in water and the water level remains below the opening 46, the intake assembly 34 can continue to provide ambient air to the engine 28. However, once the water level rises above the opening 46, water can be introduced to the intake assembly 34 and to the engine 28 which can affect proper operation of the engine 28 and could possibly cause long-term engine damage. The height of the opening 46 can therefore define a water line for the vehicle 10.

The opening 46 of the snorkel 36 can also be generally centrally located on the vehicle 10, such that the opening 46 is positioned generally midway longitudinally and laterally between the front wheels 18 and the rear wheels (e.g., 20). The more centrally located that the opening 46 is on the vehicle 10, the less likely the opening 46 is to be subjected to water if the front or rear ends 14, 16 become increasingly immersed as the vehicle 10 tips forwardly or rearwardly, or if the left or right sides 17, 19 become increasingly immersed as the vehicle 10 tips laterally.

Figure 4:
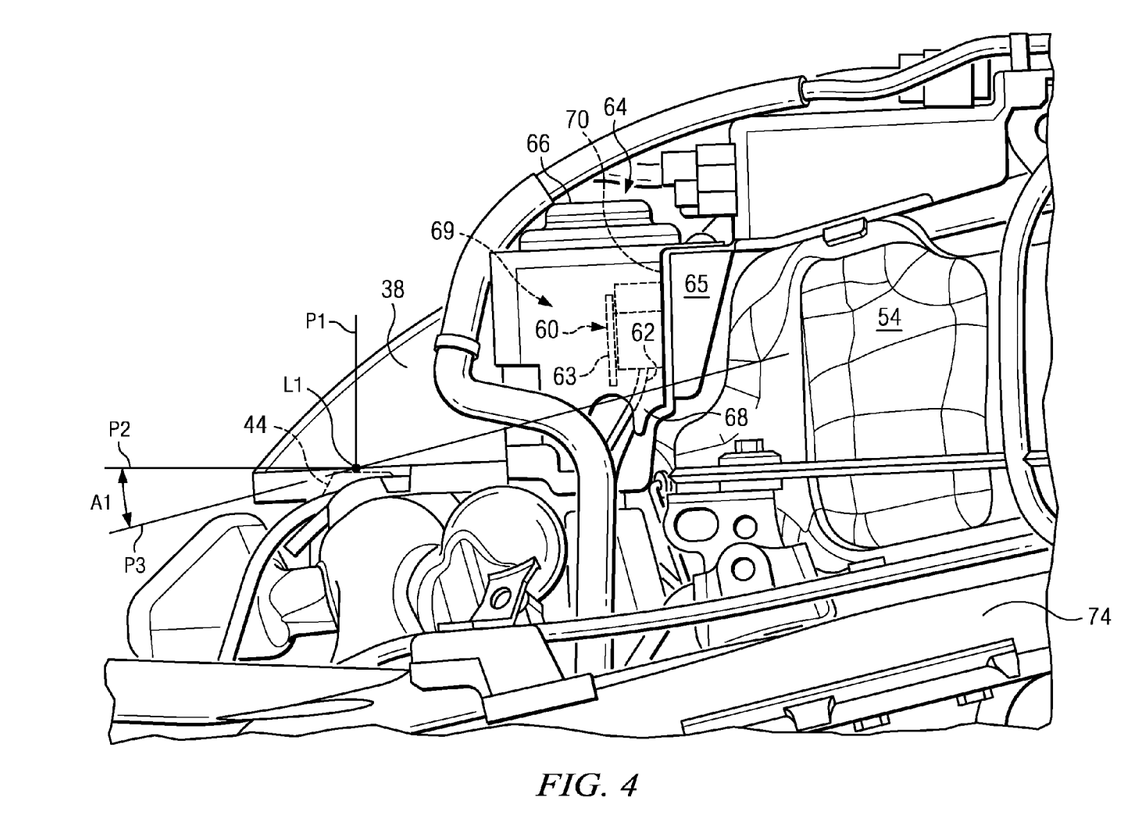
FIG. 4 is a right side perspective view depicting the snorkel, the cover member, the support housing, and the fuel tank of FIG. 2 together with an electrical coupler, shown in dashed lines, together with various other vehicular components and with certain other components removed for clarity of illustration, and with a horizontal imaginary plane and a third imaginary plane intersecting each of the opening and the vertical imaginary plane, wherein the electrical coupler is disposed beneath a seat.
Figure 5:
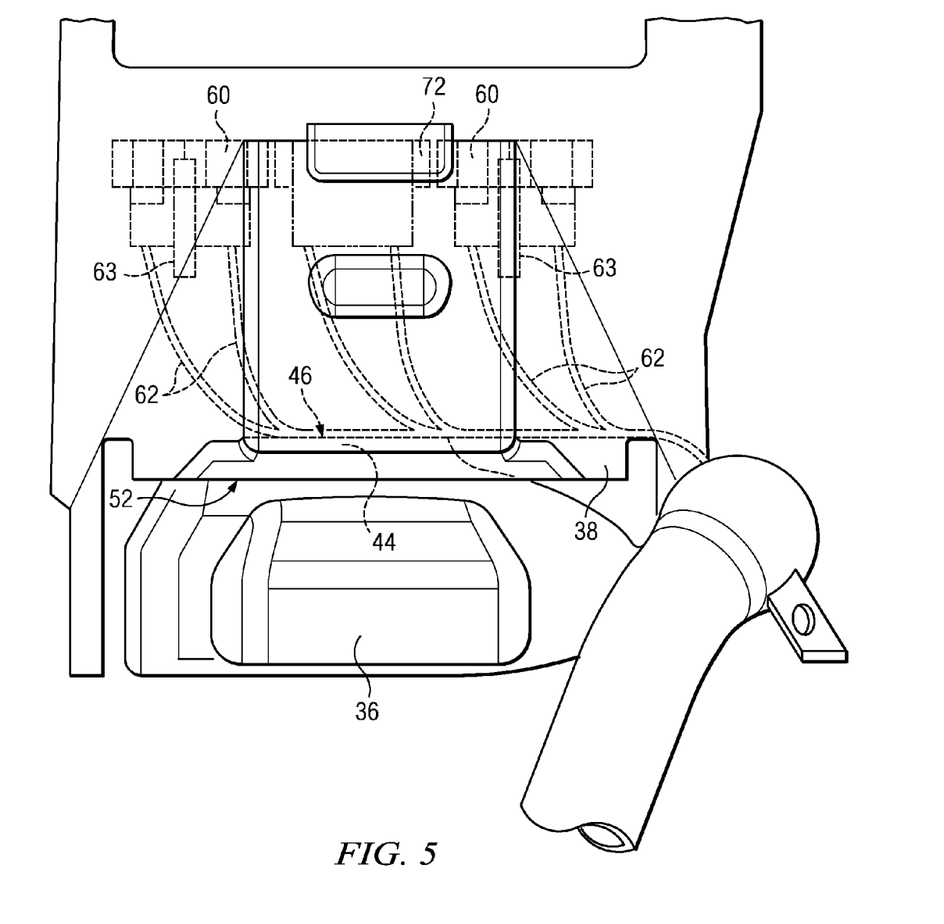
FIG. 5 is rear view depicting the snorkel, the cover member, and the support housing of FIG. 4 together with a plurality of electrical couplers and an electronic control unit shown in dashed lines, with certain components removed for clarity of illustration.

As illustrated in FIGS. 4 and 5, the vehicle 10 can include a plurality of electrical couplers 60 that are interposed between the fuel tank 54 and the cover member 38. Each electrical coupler 60 can be associated with a pair of electrical conductors 62 and can be configured to facilitate selective manual electrical disconnection and connection of the electrical conductors 62. In one embodiment, each electrical coupler 60 can be associated with only two conductors. In another embodiment, one or more of the electrical couplers 60 can be associated with three or more electrical conductors (e.g., in a wiring harness arrangement). One or more of the electrical couplers 60 can comprise a locking tab 63 which can selectively engage a protrusion (not shown) to secure the electrical connection between the electrical conductors 62. The locking tab 63 can be depressed to permit disconnection of the electrical conductors 62 from the electrical coupler 60. Alternatively, an electrical coupler can comprise a locking horseshoe clip that is selectively removable to facilitate disconnection of one or more of electrical conductors from the electrical coupler 60. In other embodiments, an electrical coupler can include any of a variety of other coupling arrangements that facilitate selective manual electrical disconnection and connection of one or more electrical conductors.

It will be appreciated that the electrical couplers 60 can facilitate selective interconnection of components of one or more electrical systems on the vehicle 10. For example, one of the electrical connectors 60 can facilitate selective electrical connection of a starter motor to another component of the vehicle's electrical system such as a battery or a solenoid. In another example, one of the electrical couplers 60 can facilitate selective electrical connection of the vehicle's lighting system to another component of the vehicle's electrical system such as a fuse, a battery, or a solenoid.

As illustrated in FIG. 4, the electrical couplers 60 can be provided within a support container 64 that is supported with respect to the frame 12 by a support bracket 65. The support container 64 can comprise a lid 66 and a base 68. The lid 66 can be releasably secured to the base 68 with clips (not shown) or other suitable alternative releasable fastening arrangements. The lid 66 and the base 68 can cooperate to define a cavity 69 and the electrical couplers 60 can be disposed entirely (or substantially entirely) within the cavity 69. More particularly, the electrical couplers 60 can be releasably coupled to an inner wall 70 of the base 68 by a stay arrangement (not shown), releasable fasteners (not shown), or any of a variety of suitable alternative releasable coupling arrangements. In one embodiment, the electrical conductors 62 can be routed through one or more openings in the base 68 and out of the cavity 69. With the lid 66 installed on the base 68, the lid 66 can overlie the base 68 and can cooperate with the base 68 to substantially conceal the electrical couplers 60. The electrical couplers 60 can be selectively accessed by removing the lid 66 from the base 68. Once the lid 66 has been removed, the electrical couplers 60 can be accessed, released from the inner wall 70, and withdrawn slightly from the base 68. The locking tab 63 of each electrical coupler 60 can then be manually actuated to facilitate electrical disconnection of the electrical conductors 62 from the electrical coupler 60.

In one embodiment, as illustrated in FIG. 4, each of the cover member 38, the electrical couplers 60, and the fuel tank 54 are disposed between left and right frame rails (right frame rail 74 shown). The support container 64 can be interposed between the cover member 38 and the fuel tank 54 such that the support container 64 serves as a front wall for the cover member 38 and at least partially obstructs debris that might otherwise be drawn into the snorkel 36. For example, during operation of the vehicle 10, ambient air can flow from the front end 14 of the vehicle 10 through the cover member 38 and to the snorkel 36. The support container 64 can disrupt the flow of air directly into the cover member 38 enough to obstruct debris from entering the intake assembly 34.

It will be appreciated that locating the electrical couplers 60 between the fuel tank 54 and the cover member 38 in this manner can provide shorter wiring harness lengths than are possible in some conventional arrangements with the electrical couplers located towards the rear end 16 of the vehicle 10. It will be also appreciated that any of a variety of other couplers or other electrical components can be collocated with the electrical couplers 60 inside of the support container 64. For example, as illustrated in FIG. 5, an engine control unit 72 can be coupled to the inner wall 70 of the base 68 and provided between the electrical couplers 60.

The electrical couplers 60 are shown in FIGS. 4 and 5 to be located above and forwardly of the opening 46 of the snorkel 36. With the electrical couplers 60 located above the opening 46, the vertical water level will not typically reach the electrical couplers 60 until it first reaches the opening 46 when the vehicle 10 is immersed in water. Therefore, by the time the vertical water level has elevated enough to reach the electrical couplers 60, water will likely have been introduced into the opening 40 of the snorkel 36 thereby affecting operation of the engine 28. As this latter condition is typically avoided by an operator of the vehicle 10, the electrical couplers 60 can be non-waterproof electrical couplers, which can be more cost effective and time efficient to implement than waterproof electrical couplers.

With the electrical couplers 60 located forwardly of the opening 46, when the vehicle 10 is immersed in water and tips rearwardly (e.g., such that the rear end 16 becomes submerged in the water), the water level will not reach the electrical couplers 60 until it first reaches the opening 40. Moreover, if the vehicle 10 tips forwardly such that the front end 14 becomes submerged in the water, the water likely will not reach the electrical couplers 60 until the front end 14 has become excessively submerged thereby causing other adverse effects to the operation of vehicle 10 (e.g., to the electrical system or the cooling system).

As illustrated in FIG. 4, a vertical imaginary plane P1 and a horizontal imaginary plane P2 are shown to each intersect the opening 46 of the snorkel 36. The vertical imaginary plane P1 and the horizontal imaginary plane P2 can intersect each other at an imaginary line L1. The vertical imaginary plane P1 can extend laterally across the vehicle 10 and can bisect the opening 46 of the snorkel 34 into front and rear portions. As illustrated in FIG. 4, a third imaginary plane P3 can intersect the vertical imaginary plane P1 and the horizontal imaginary plane P2 such that the imaginary line L1 is contained entirely within the third imaginary plane P3. The third imaginary plane P3 can be angled from the horizontal imaginary plane P2 by an angle A1 that is between about 20 degrees and about 30 degrees. In one embodiment, each of the electrical couplers 60 can be located such that they are forwardly of the vertical imaginary plane P1, above the third imaginary plane P3 and adjacent to the front portion of the opening 46, as shown, for example, in FIG. 4. As such, if the vehicle 10 is immersed in water, and the water level approaches the opening 46 of the snorkel 36, the water level will typically reach the opening 46 first before it is able to reach the electrical couplers 60. It is to be understood that the angle A1 can be selected to be the maximum angle that the vehicle 10 is able to achieve when the vehicle 10 is tipped forwardly with the water level at the immersion level, before the front end 14 becomes excessively submerged and adversely affects the operation of the vehicle 10. As such, the water likely will not reach the electrical couplers 60 until the front end 14 has become excessively submerged.

It will be appreciated that a plane described herein as being oriented horizontally, such as horizontal imaginary plane P2, should be understood to mean that the plane is parallel to a base plane (not shown) having the rotation axes of the front wheels 18 and the rear wheels 20 contained therein when the vehicle 10 is at rest, and/or that the base plane is parallel to the longitudinal axis L. A plane described herein as being oriented vertically, such as vertical imaginary plane P1, can be understood to mean that the plane is perpendicular to the base plane.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle extending along a longitudinal axis between a front end and a rear end, the vehicle comprising:
   a frame;
   a steering assembly pivotally coupled to the frame;
   an engine supported by the frame;
   a seat supported by the frame rearwardly of the steering assembly and overlying at least a portion of the engine;
   an intake assembly comprising:
      a snorkel comprising:
         an inlet port having a neck portion that defines an opening; and
         an outlet port in fluid communication with the engine; and
      a cover member in fluid communication with the inlet port of the snorkel;
   at least two electrical conductors; and an electrical coupler engaged with each of the at least two electrical conductors and configured to facilitate selective manual electrical disconnection of the at least two electrical conductors; wherein:
a first imaginary plane intersects the opening of the inlet port and is substantially horizontal;
a second imaginary plane extends laterally across the vehicle, intersects the opening of the inlet port, and intersects the first imaginary plane at a right angle;
the electrical coupler is disposed entirely above the first imaginary plane and entirely forwardly of the second imaginary plane; and
the first imaginary plane and the second imaginary plane intersect at an imaginary line, a third imaginary plane intersects each of the first imaginary plane and the second imaginary plane such that the imaginary line resides entirely within the third imaginary plane, the third imaginary plane is angled from the first imaginary plane by an angle of between about 20 degrees and about 30 degrees, and the electrical coupler is disposed entirely above the third imaginary plane.

2. The vehicle of claim 1 further comprising an engine control unit located adjacent to the electrical coupler and disposed above the first imaginary plane and forwardly of the second imaginary plane.

3. The vehicle of claim 1 further comprising a support housing comprising a lid and a base, wherein the base is coupled to the frame and cooperates with the lid to define a cavity, and wherein the electrical coupler is releasably attached to the base and is disposed within the cavity.

4. The vehicle of claim 3 wherein said at least two electrical conductors are routed through an opening in the base.

5. The vehicle of claim 4 wherein the base includes a front wall and the electrical coupler is releasably attached to the front wall.

6. The vehicle of claim 1 wherein the second imaginary plane bisects the opening of the neck portion into a front portion and a rear portion, and wherein the electrical coupler is adjacent to the front portion.

7. The vehicle of claim 1 wherein the electrical coupler is disposed beneath the seat.

8. The vehicle of claim 1 further comprising a fuel tank supported by the frame, wherein the electrical coupler is interposed between the fuel tank and the cover member.

9. The vehicle of claim 8 further comprising a support housing comprising a lid and a base, wherein the base is coupled to the frame and cooperates with the lid to define a cavity, and wherein the electrical coupler is releasably attached to the base and is disposed within the cavity.

10. The vehicle of claim 8 wherein the frame comprises a left frame rail and a right frame rail and each of the cover member, the electrical coupler, and the fuel tank are disposed between the left and right frame rails.

11. The vehicle of claim 1 wherein the cover member defines a lower opening, and wherein the neck portion of the inlet port extends at least partially into the lower opening.

12. A vehicle extending along a longitudinal axis between a front end and a rear end, the vehicle comprising:
a frame;
a plurality of wheels rotatably supported by the frame;
a steering assembly pivotally coupled to the frame and configured to facilitate steering of at least one the plurality of wheels;
an engine supported by the frame;
a seat supported by the frame rearwardly of the steering assembly and overlying at least a portion of the engine;
an intake assembly comprising:
a snorkel comprising:
an inlet port disposed rearwardly of the steering assembly, the inlet port having a neck portion that defines an opening; and
an outlet port disposed rearwardly of the steering assembly, the outlet port being in fluid communication with the engine; and
a cover member disposed rearwardly of the steering assembly, the cover member being in fluid communication with the inlet port of the snorkel;
at least two electrical conductors; and
an electrical coupler engaged with each of the at least two electrical conductors and configured to facilitate selective manual electrical disconnection of the at least two electrical conductors; wherein:
a first imaginary plane intersects the opening of the inlet port and is substantially horizontal;
a second imaginary plane extends laterally across the vehicle, intersects the opening of the inlet port, and intersects the first imaginary plane at a right angle;
the electrical coupler is disposed entirely above the first imaginary plane and entirely forwardly of the second imaginary plane;
the first imaginary plane and the second imaginary plane intersect at an imaginary line;
a third imaginary plane intersects each of the first imaginary plane and the second imaginary plane such that the imaginary line resides entirely within the third imaginary plane;
the third imaginary plane is angled from the first imaginary plane by an angle of between about 20 degrees and about 30 degrees; and
the electrical coupler is disposed entirely above the third imaginary plane.

13. A vehicle extending along a longitudinal axis between a front end and a rear end, the vehicle comprising:
a frame;
a plurality of wheels rotatably supported by the frame;
a steering assembly pivotally coupled to the frame and configured to facilitate steering of at least one the plurality of wheels;
an engine supported by the frame;
a seat supported by the frame rearwardly of the steering assembly and overlying at least a portion of the engine;
an intake assembly disposed rearwardly of the steering assembly and comprising:
a snorkel comprising:
an inlet port having a neck portion that defines an opening; and
an outlet port in fluid communication with the engine; and
a cover member defining a lower opening and overlying the inlet port of the snorkel wherein the neck portion of the inlet port extends at least partially into the lower opening;
at least two electrical conductors; and
an electrical coupler releasably engaged with each of the at least two electrical conductors and configured to facilitate selective manual electrical disconnection of the at least two electrical conductors; wherein:
a first imaginary plane intersects the opening of the inlet port and is substantially horizontal;
a second imaginary plane extends laterally across the vehicle, intersects the opening of the inlet port, and intersects the first imaginary plane at a right angle;
the first imaginary plane and the second imaginary plane intersect at an imaginary line;

a third imaginary plane intersects each of the first imaginary plane and the second imaginary plane such that the imaginary line resides entirely within the third imaginary plane;

the third imaginary plane is angled from the first imaginary plane by an angle of between about 20 degrees and about 30 degrees; and the electrical coupler is disposed entirely above the third imaginary plane.

14. The vehicle of claim 13 wherein the electrical coupler is disposed beneath the seat.

15. The vehicle of claim 13 further comprising a fuel tank supported by the frame, wherein the electrical coupler is interposed between the fuel tank and the cover member.

16. The vehicle of claim 15 further comprising a support housing comprising a lid and a base, wherein the base is coupled to the frame and cooperates with the lid to define a cavity, and wherein the electrical coupler is releasably attached to the base and is disposed within the cavity.

17. The vehicle of claim 16 wherein the electrical coupler is disposed beneath the seat.

18. The vehicle of claim 13 further comprising an engine control unit located adjacent to the electrical coupler and disposed entirely above the third imaginary plane and forwardly of the second imaginary plane.

* * * * *